United States Patent [19]
College et al.

[11] Patent Number: 5,084,255
[45] Date of Patent: Jan. 28, 1992

[54] SULFUR DIOXIDE REMOVAL PROCESS WITH GYPSUM AND MAGNESIUM HYDROXIDE PRODUCTION

[75] Inventors: John W. College, Pittsburgh; Lewis B. Benson, Coraopolis, both of Pa.

[73] Assignee: Dravco Lime Company, Pittsburgh, Pa.

[21] Appl. No.: 675,418

[22] Filed: Mar. 26, 1991

[51] Int. Cl.$^5$ ............................................ C01B 17/00
[52] U.S. Cl. ..................................................... 423/242
[58] Field of Search ........................ 423/242 A, 242 R

[56] References Cited

U.S. PATENT DOCUMENTS

| | | | |
|---|---|---|---|
| 3,914,378 | 10/1975 | Selmeczi | 423/242 |
| 3,919,393 | 11/1975 | Selmeczi | 423/242 |
| 3,919,394 | 11/1975 | Selmeczi | 423/242 |
| 4,014,978 | 3/1977 | Klein et al. | 423/242 |
| 4,046,856 | 9/1977 | Itoo et al. | 423/166 |
| 4,193,971 | 3/1980 | Kawamata et al. | 423/242 |
| 4,246,245 | 1/1981 | Abrams et al. | 423/242 |
| 4,804,523 | 2/1989 | Abrams et al. | 423/242 |
| 5,039,499 | 8/1991 | Stowe | 423/242 |

Primary Examiner—Gregory A. Heller
Attorney, Agent, or Firm—Armstrong, Nikaido, Marmelstein, Kubovcik & Murray

[57] ABSTRACT

Sulfur dioxide is removed from flue gases using an aqueous solution of magnesium components in a wet scrubber, with oxidation of a portion of the aqueous discharge from the scrubber. Calcium sulfate is added to the portion of aqueous discharge at the oxidizer to form an oxidized aqueous effluent containing calcium sulfate solids and dissolved magnesium sulfate. The oxidized aqueous effluent is regenerated by addition of lime, in a regeneration tank, which precipitates calcium sulfate as gypsum, with gypsum returned to the oxidizer as the calcium sulfate added thereto. Preferably, the aqueous discharge from the scrubber is divided, with a major portion passed to a separator to remove gypsum, therefrom, while a minor portion is passed to the regeneration tank. Magnesium sulfate solution, after separation of gypsum from the major portion may also be fed to the regeneration tank.

21 Claims, 2 Drawing Sheets

SULFUR DIOXIDE REMOVAL PROCESS WITH GYPSUM AND MAGNESIUM HYDROXIDE PRODUCTION

CROSS-REFERENCE TO RELATED APPLICATION

This application is related to, and an improvement over, the process described in co-pending U.S. application Ser. No. 188,254, filed Apr. 29, 1988 in the name of Donald H. Stowe, Jr. entitled, "Process for Desulfurization of Sulfur Dioxide-Containing Gas Stream", now U.S. Pat. No. 5,039,499, issued Aug. 13, 1991, which is assigned to the assignee of the present invention.

BACKGROUND OF THE INVENTION

In the process described in application Ser. No. 188,254, the contents of said application incorporated by reference herein, an aqueous solution of magnesium hydroxide is used to remove sulfur dioxide from a flue gas stream, in a wet scrubber. Spent solution or effluent from the scrubber is subjected to an oxidation step. In an oxidizer, air is sparged through the solution to convert sulfites to sulfates. The oxidized product, containing magnesium sulfate, is treated or regenerated by addition of a magnesium-containing lime slurry to precipitate calcium sulfate ($CaSO_4 \cdot 2H_2O$) from the aqueous media and form a magnesium hydroxide ($Mg(OH)_2$) suspension, while magnesium hydroxide is returned to the scrubber and separated calcium sulfate precipitate, or gypsum, is removed from the system for use or disposal. While this process is acceptable, certain problems exist. For example, in such a process, it is somewhat difficult to separate or remove calcium sulfate from the system because of the dewatering properties of the calcium sulfate-containing aqueous media. Also, in such a process, the gypsum product may contain magnesium hydroxide, which is an objectionable component in the primary uses to which gypsum is put. In addition, it is difficult in such a process to control the pH value in the oxidation step, with sometimes, release of sulfur dioxide occurring from the oxidizer unless care is taken.

It is an object of the present invention to provide a scrubbing method for flue gases, using a magnesium hydroxide scrubbing system, that will provide a sludge that is more readily dewatered.

It is another object of the present invention to provide a scrubbing method for flue gases, using a magnesium hydroxide scrubbing system, where a higher percentage of the total amount of gypsum and magnesium hydroxide are removed from the sludge discharged from the system than with previous such processes.

It is a further object of the present invention to provide a scrubbing method for flue gases, using a magnesium hydroxide scrubbing system, which provides a more saleable gypsum from a magnesium hydroxide scrubbing process, while also recovering a higher amount of magnesium hydroxide from the process.

SUMMARY OF THE INVENTION

Sulfur dioxide is removed from flue gases using an aqueous solution of magnesium components in a wet scrubber, with a portion of the aqueous discharge from the scrubber containing magnesium sulfite passed to an oxidizer. Calcium sulfate is added to the portion of aqueous discharge at the oxidizer to form an oxidized aqueous effluent containing calcium sulfate solids and dissolved magnesium sulfate. The oxidized aqueous effluent is passed to a regeneration tank where lime is added to precipitate gypsum and forms an aqueous magnesium hydroxide suspension in the oxidized aqueous effluent. The precipitated gypsum is separated from the magnesium hydroxide suspension, with at least a portion of the gypsum returned to the oxidizer as added calcium sulfate.

In another embodiment, the oxidized aqueous effluent is divided into major and minor portions prior to passage to the regeneration tank. The major portion of the oxidized aqueous effluent is separated into calcium sulfate solids (gypsum) and a magnesium sulfate solution, while the minor portion of the oxidized aqueous effluent is passed to the regeneration tank. All or a portion of the magnesium sulfate solution, after separation of calcium sulfate solids may be charged to the regeneration tank. Preferably, the major portion of the oxidized aqueous effluent passed to the separator comprises about 75 percent by weight of the oxidized aqueous effluent, while the minor portion thereof passed to the regeneration tank comprises about 25 percent by weight.

DESCRIPTION OF THE DRAWINGS

The invention will become more readily apparent from the following description of preferred embodiments thereof shown, by way of example only, in the accompanying drawings, wherein.

DETAILED DESCRIPTION

Figure 1:
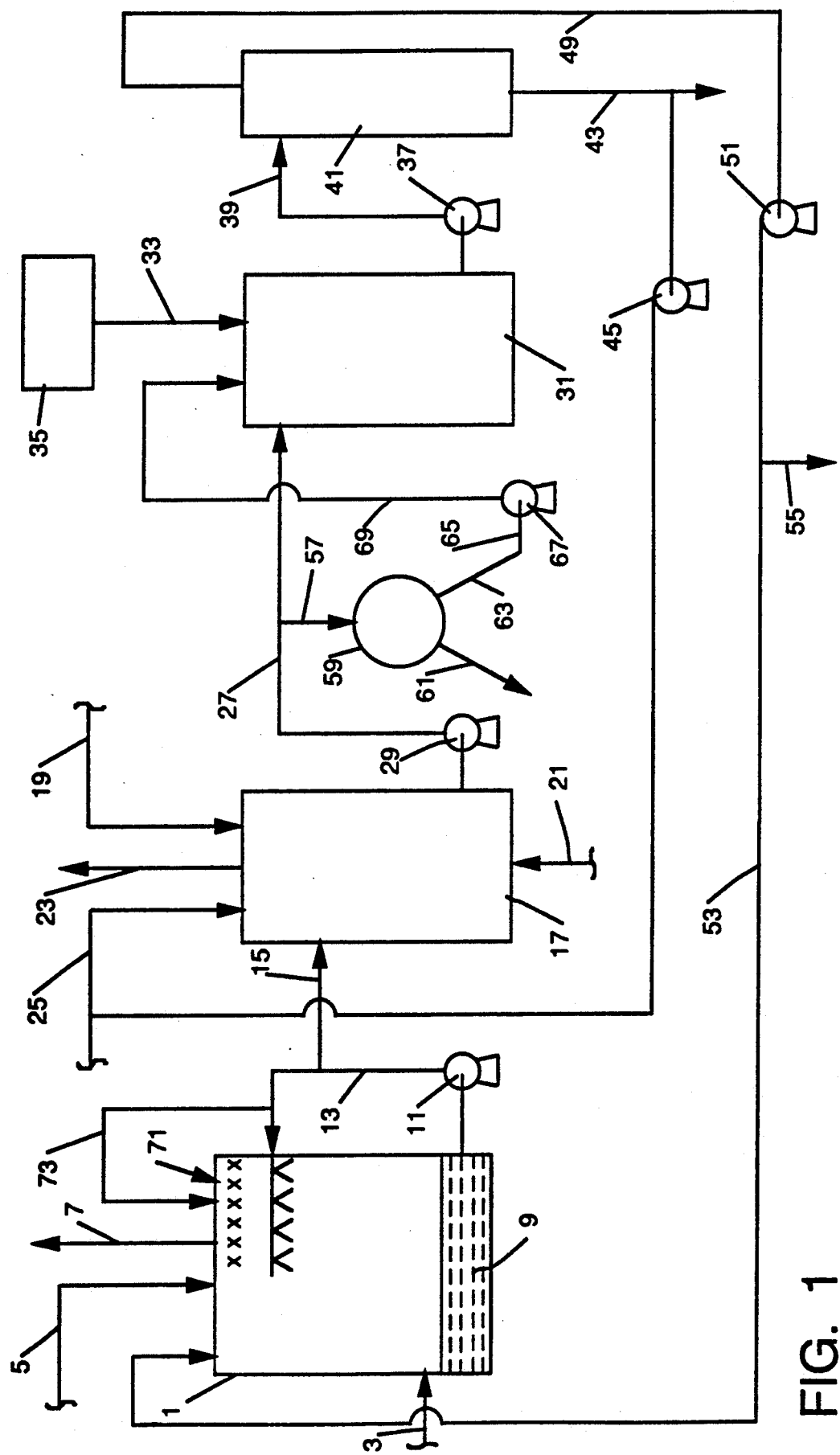
FIG. 1 is a schematic illustration of the preferred method of the present invention.

The present method is an improved method for removing sulfur dioxide from flue gases using magnesium hydroxide addition to a wet scrubber for contact with the flue gas, with magnesium sulfite formed which, in solution, removes the sulfur dioxide. The major reactions that occur in the wet scrubbing unit, where the aqueous solution of magnesium components contacts the flue gases are:

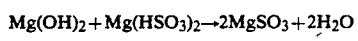

$$Mg(OH)_2 + Mg(HSO_3)_2 \rightarrow 2MgSO_3 + 2H_2O$$

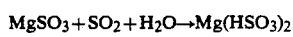

$$MgSO_3 + SO_2 + H_2O \rightarrow Mg(HSO_3)_2$$

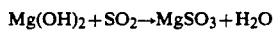

$$Mg(OH)_2 + SO_2 \rightarrow MgSO_3 + H_2O$$

When using magnesium components to scrub the flue gases, the scrubber liquor is clear with very little solids content present, which prevents clogging or scaling of the wet scrubbing unit.

The aqueous solution of magnesium components should have a magnesium ion content of between about 2,000 to 15,000 parts per million, with fresh or recycled magnesium hydroxide solution or suspension added to the scrubber to replenish that which is removed, as hereinafter described. In the scrubbing unit, the pH of collected aqueous medium should be maintained in the range of 6.0–7.0, and most preferably in a range of 6.0–6.5.

The scrubbing solution is collected, as is conventional, in the bottom portion of the scrubbing unit, with a major portion of the scrubbing solution recycled through the scrubbing unit, while a portion of the aqueous discharge is withdrawn so as to remove the sulfur reactants of primarily magnesium sulfite, and some magnesium bisulfite, that are dissolved therein.

The portion of aqueous discharge withdrawn from the scrubbing unit may then be subjected to an oxidation step, with the major reactions occurring during oxidation being:

$$MgSO_3 + \tfrac{1}{2}O_2 \rightarrow MgSO_4$$

$$Mg(HSO_3)_2 + O_2 \rightarrow MgSO_4 + H_2SO_4$$

A problem exists in the oxidation step relative to controlling the pH in the oxidizing unit. With $HSO_3^-$ ions present, the same are converted to $H^+$ and $SO_4^=$ in the oxidizing unit. The liberated $H^+$ drives the pH down in the oxidizing unit, and when the pH is lowered to a range of about 1.5 to 3.0, new incoming aqueous discharge from the scrubber tends to lose dissolved $SO_2$, which can escape from the oxidation unit.

The oxidized aqueous effluent, containing dissolved magnesium sulfate, is then regenerated by addition of magnesium-containing lime (lime containing about 5 weight percent magnesium oxide) thereto, with the resulting reaction:

$$MgSO_4 + Ca(OH)_2 \rightarrow Mg(OH)_2 \cdot 5H_2O + CaSO_4 \cdot 2H_2O$$

the produced calcium sulfate or gypsum precipitating from the solution, which precipitate is removed from the magnesium hydroxide suspension also produced in the regeneration step. The separated calcium sulfate, or gypsum, may be sold and used in other applications, if desired, or disposed of in a conventional manner. The magnesium hydroxide produced may be recycled, in whole or in part, to the scrubbing unit.

In accordance with the method of the present invention, the above-described magnesium scrubbing system is improved in a manner that provides recovery of maximum amounts of both gypsum and magnesium hydroxide, a gypsum product that is less contaminated with magnesium hydroxide, and more ready control of the pH during the oxidation step.

Referring now to FIG. 1, the present preferred method is schematically illustrated, showing a wet scrubbing unit 1 to which flue gases containing sulfur dioxide are directed through line 3. An aqueous medium containing magnesium hydroxide is fed to the scrubbing unit 1 through line 5, with the aqueous medium contacting the countercurrent flowing flue gases to scrub sulfur dioxide therefrom, with the clean flue gases discharged through an outlet line 7. The liquor 9, which collects in the bottom of the wet scrubbing unit or in a recycle tank, is discharged from the scrubbing unit 1, and the aqueous discharge is recycled to the scrubbing unit by use of a pump 11 through line 13. A portion of the aqueous discharge, which contains magnesium sulfite, is removed from recycle line 13 and passed through line 15 to an oxidation unit 17. As previously mentioned, the collected aqueous medium, which is to be recycled, is at a pH of about 6.0 to 6.5. In order to maintain the pH in the oxidation unit 17 at the preferred range, sulfuric acid may be added to the oxidation unit 17 through line 19. Air, or other oxidizing gas, is sparged through the oxidizing unit 19 from line 21, from a source (not shown), with gases in the oxidation unit 19 discharged through line 23. The pH of the contents of the oxidation unit is maintained above 4.5 and is preferably maintained at a value between 5.0–5.6.

Calcium sulfate is added to the magnesium sulfite-containing aqueous discharge in the oxidation unit 17 through line 25. Oxidation of the aqueous discharge containing magnesium sulfite in the oxidation unit 17, forms an oxidized aqueous effluent containing calcium sulfate solids and dissolved magnesium sulfate, which is discharged from the oxidation unit 17 through discharge line 27, by means of a pump 29.

The oxidized aqueous effluent is passed through line 27 to a regeneration tank 31. Lime is added through line 33, from a source 35, to the regeneration tank 31, which reacts with the dissolved magnesium sulfate in the oxidized aqueous effluent to form and precipitate gypsum and form an aqueous magnesium hydroxide suspension in the oxidized aqueous effluent. The pH of the contents of the regeneration tank is preferably maintained at a value between 10.8–11.0. Discharge from the regeneration tank 31 is passed by pump 37 through line 39 to a solids separator 41, such as a hydrocylcone, where the precipitated gypsum is separated from the aqueous magnesium hydroxide suspension. The calcium sulfate solids, or gypsum, after separation, will retain some magnesium hydroxide, about 2 to 5 percent by weight, and is discharged as underflow from the separator 41 through line 43. The underflow from line 43 is removed from the system and concentrated, such as by filtering on a belt filter, to produce a gypsum product for disposal or collection, use, or sale. At least a portion of such underflow is fed by pump 45 through line 47 to line 25 for use as added calcium sulfate in the oxidation unit 17. The separator 41 is used to separate the larger size gypsum crystals (e.g., 60 to 70 microns) from the smaller size (e.g., 10 microns) magnesium hydroxide solids. The separator is preferably a pair of hydrocylones, which are connected in series, with underflow from a first hydrocyclone diluted and fed to a second hydrocyclone for more efficient separation. The smaller magnesium hydroxide solids are recovered in hydrocyclone overflow and the larger gypsum crystals are contained in the hydrocyclone underflow. Overflow from the separator 41, which comprises an aqueous magnesium hydroxide suspension, flows through line 49 and by pump 51 to line 53, through which the suspension or any portion thereof is charged to the scrubbing unit 1. Alternatively all or any portion of the aqueous magnesium hydroxide suspension may be directed from line 53 through line 55 for use elsewhere, or sale as a product of the method.

An important aspect of the present invention is the ability to use the aqueous solution being recycled to the wet scrubbing unit as wash liquid to wash the demisters in the scrubbing unit. As illustrated in the drawings, a demisting device 71 is provided in the upper region of the wet scrubbing unit 1, through which the cleaned gases pass prior to discharge through outlet line 7. The demisting device 71 removes water droplets from the clean gas prior to such discharge. The demister 71 must be periodically washed, and since the recycle solution does not contain solids, such as are found in conventional lime scrubbing systems, in the form of calcium sulfate, a portion of the recycle solution from line 13 may be directed through line 73 for use as demister wash liquid.

EXAMPLE 1

As an example of the effectiveness of the present process where calcium sulfate is returned to the oxidizer, a pilot facility was used where thickener overflow from a magnesium scrubber unit, containing magnesium sulfite, was introduced to an oxidizing tower at a rate of 25 gallons/minute. Air was blown through the oxidizing tower at 2000 ACFM to oxidize the sulfite. The residence time in the 1600 gallons/minute tower was approximately one hour. A bleed from the oxidizing tower was passed to a regeneration tank, an agitated 2400 gallon tank with a residence time of about 1.6 hours. Lime slurry was added to the tank to maintain pH at 10.8-11.0. A bleed from the regeneration tank was pumped to a 3 inch hydroclone for solids separation. The underflow or solids-containing portion could be partially recycled or taken back to the scrubbing system main line slurry tank. The hydroclone overflow or liquid was also sent back to the lime slurry tank.

The oxidizer and regeneration tanks were on automatic pH control, with sulfuric acid added to the oxidizer to reduce the pH, and lime to the regeneration tank to raise the pH when desired. The oxidizer and regeneration tanks were also on automatic level control and the throughput of the system was controlled by the speed of the hydroclone feed pump.

Tests were performed to evaluate the effect of recycle of a portion of calcium sulfate solids from the hydroclone underflow to the oxidation tank. The calcium levels in the thickener overflow are generally in the range of 50-150 mg/l, while solids recycle to the oxidation tank also provides alkalinity to the tower. The oxidation of sulfites produces sulfate. The oxidation of bisulfites however produces a H+ ion for every mole of bisulfite in solution. This acid production in a non-buffered system causes the pH to drop, in this case, to 2.3-2.7. This drop in pH increases the $SO_2$ off gassing potential. If oxidation is not very fast, the dissolved $SO_2$ will be stripped out with the oxidizing air stream. With the recycle of gypsum from the thickener underflow comes a small amount of $Mg(OH)_2$. About 5% of the solids composition is $Mg(OH)_2$. This neutralizes the acid being produced in the tower and offers the ability to control the tower pH.

In this system, it was found that a set point pH of 5.2 was best controlled between 4.5-5.7. Any excess base being recycled to the tower was neutralized with sulfuric acid. The recycle rate of the hydroclone underflow solids was approximately ⅛ to 1/5 of the total underflow stream. This recycle rate could be adjusted to meet incoming acid production to minimize sulfuric acid consumption.

The gypsum particles from the oxidizer are better formed and much stronger. These gypsum particles act as seeds in the regeneration tank. The larger and better formed the foundation particle, the better formed the final product will be. The other advantage of recycle is minimizing the quick quench of the oxidizer liquor. Instead of going from an extreme pH of 2.4, 50 ppm Ca, 13,000 ppm $SO_4$ to pH 11.0, 2000 ppm $SO_4$, 2000 ppm Ca, a more moderate approach from pH 5.2, 500 ppm Ca, 13,000 $SO_4$ is available. The solution being already saturated for gypsum slows nucleation rate in the regeneration tank and offers a greater chance of larger gypsum crystal growth.

The recycle of solids to the oxidation tower proved to be a positive step. The microscopic examination showed the best formed crystals. The separation was the best achieved with $Mg(OH)_2$ at 90% recovery, 90% gypsum recovery and purities of 80% $Mg(OH)_2$ in the overflow and 93% gypsum in the underflow.

Referring now to Table 1, the effect of solids recycle of calcium sulfate to the oxidizer tower can best be exhibited using data where feed solids are comparable, for example, by comparing Test C when no recycle was employed and Test F when it was, and, for example, comparing Test B with Test G. The hydroclone configuration was ¼ inch apex by ⅜ inch vortex and the total flow to the hydroclone was 25 gallons/min for all data.

TABLE I

| TEST | FEED % SOLIDS | REGEN TANK pH | | % SOLIDS | WGT. % $Mg(OH)_2 \cdot 5H_2O$ CONCENTRATION | WGT. % GYPSUM CONCENTRATION | % Mg RECOVERY | % GYPSUM RECOVERY | AVERAGE OF % Mg + % GYPSUM RECOVERY |
|---|---|---|---|---|---|---|---|---|---|
| A | 4.07 | 10.9 | OF | 1.02 | 76.94 | 20.53 | 82.78 | — | |
|   |      |      | UF | 18.32 | 9.49 | 86.97 | — | 87.73 | 85.26 |
| B | 3.69 | 10.9 | OF | 1.18 | 64.80 | 27.84 | 77.23 | — | |
|   |      |      | UF | 20.98 | 11.61 | 81.65 | — | 82.83 | 80.03 |
| C | 3.08 | 10.9 | OF | 1.00 | 76.74 | 18.76 | 76.19 | — | |
|   |      |      | UF | 23.96 | 10.89 | 87.18 | — | 91.10 | 83.65 |
| D | 2.00 | 10.9 | OF | 0.75 | 70.82 | *29.18 | 86.77 | — | |
|   |      |      | UF | 14.75 | 7.80 | *92.2 | — | *81.39 | 84.08 |
| E | 1.92 | 10.9 | OF | 0.84 | 64.40 | *35.6 | 88.88 | — | |
|   |      |      | UF | 14.60 | 6.46 | *93.54 | — | *76.62 | 82.75 |
| WITH RECYCLE TO OXIDIZER | | | | | | | | | |
| F | 3.04 | 10.9 | OF | 1.12 | 79.32 | 22.58 | 89.31 | — | |
|   |      |      | UF | 20.25 | 5.98 | 88.37 | — | 86.14 | 87.73 |
| G | 3.60 | 10.9 | OF | 1.27 | 70.81 | 26.66 | 89.70 | — | |
|   |      |      | UF | 23.35 | 4.98 | 94.17 | — | 85.21 | 87.46 |
| H | 2.25 | 10.8 | OF | 1.17 | 79.96 | 16.88 | 87.49 | — | |
|   |      |      | UF | 21.20 | 5.96 | 93.20 | — | 91.38 | 89.44 |

*CALCULATED BY DIFFERENCE

A liquor analysis of the streams from the system gave the following:

| | THICKENER OVERFLOW | OXIDIZER LIQUOR WITHOUT SOLIDS RECYCLE | OXIDIZER LIQUOR WITH RECYCLE OF SOLIDS | REGENERATION TANK |
|---|---|---|---|---|
| pH | 6.5-8.5 | 2.3-2.7 | 4.7-5.6 | 10.8-11.0 |

-continued

| | | | | |
|---|---|---|---|---|
| $Ca^{++}$ mg/l | 50-150 | 50-150 | 500-600 | 1,700-2,200 |
| $Mg^{++}$ mg/l | 2,000-3,500 | 2,000-3,500 | 2,000-3,500 | 0-100 |
| $SO_3^{904=}$ mg/l | 1,500-3,000 | <100 | <100 | 0 |
| $SO_4=$ mg/l | 8,000-10,000 | 10,000-13,000 | 10,000-13,000 | 1,500-2,000 |
| $Cl-$ mg/l | 1,000-2,000 | 1,000-2,000 | 1,000-2,000 | 1,000-2,000 |

HYDROCYCLONE FEED

| | |
|---|---|
| % SOLIDS | 2.4-5.0 |
| PARTICLE SIZE | 30-55 MICRONS |

HYDROCYCLONE PRODUCT ANALYSIS

| | HYDROCYCLONE OVERFLOW | HYDROCYCLONE UNDERFLOW |
|---|---|---|
| % SOLIDS | .75-2.00 | 10.0-25.0 |
| PARTICLE SIZE MICRON | 4-6.5 | 35-65 |
| Samples dried at 50° C. and then analyzed | | |
| $Mg(OH)_2 \cdot 5H_2O$ | 70-80 | 3-10 |
| $CaSO_4 \cdot 2H_2O$ | 16-25 | 80-93 |
| $Mg(OH)_2$ recovery | 80-96 | — |
| $CaSO_4$ recovery | — | 89-93 |

The recycle of calcium sulfate solids as hydroclone underflow back to the oxidizing tower solved several problems. Small gypsum crystals dissolved, leaving the larger ones for seeding and reprecipitation of dissolved calcium sulfate, and alkalinity was provided to the oxidizing tower.

The recycle of calcium sulfate solids back to the oxidizing tower also provided for a maximum amount of the total of the magnesium hydroxide and gypsum recovered from the system. As shown in the Table, the average of the sums of the magnesium recovered and the gypsum recovered where recycle was used (F-H) was consistently higher than where no recycle was effected (A-E).

EXAMPLE 2

Tests were performed on a 3 Megawatt wet scrubbing unit for removing sulfur dioxide from flue gases to demonstrate the effectiveness of the present method. The general operating parameters of the wet scrubbing unit and recycle tank operation were:

| | |
|---|---|
| Inlet Gas Velocity | 12-15 ft/sec. |
| Inlet Gas Temperature | 300° F. |
| Outlet Gas Temperature | 130° F. |
| Gas Flow | 5000 standard ft$^3$/min. |
| Recycle Tank Level | 50% (1500 gal) |
| Recycle Tank pH | 6.0-6.5 |
| Flow Through Recycle Tank | 15-25 gallons/min. |
| Inlet SO$_2$ Loading | 900-2500 parts per million | with the pH in the recycle tank controlled using a magnesium hydroxide slurry. A portion of the recycle liquor at a pH of 6.0-6.5 was passed to the oxidation unit and the pH in the oxidation unit maintained at a constant pH of between 5.0 to 5.6, with sulfuric acid added as needed. Flow through the oxidation unit was 15-25 gallons/minute and residue time therein maintained between 1.0 to 1.8 hours. A recycle stream of separator underflow (gypsum slurry) was added to the oxidizer and comprised about 15-25% of the separator underflow. The oxidized liquor in the regeneration tank was agitated to get good mixing with lime added thereto, and the pH in the regeneration tank maintained between 10.8 to 11.0. Flow through the regeneration tank was 15 to 25 gallons/minute and a residence time of 1.6 to 2.7 hours effected. The percent solids in the regeneration tank was found to be about 4-6 percent by weight.

The discharge from the regeneration tank was passed to a separator that comprised two hydroclones connected in series. The second hydroclone was found to be needed to remove enough magnesium to keep the scrubbing process operating and recover $Mg(OH)_2$. The use of a second hydroclone also improved the purity of the gypsum product. For hydroclone no. 1, the apex was ¼ inch and the vortex ½ inch. A feed flow of 7-8 gallons/min. was used. The overflow from hydroclone no. 2 contained 0.3 to 0.7 percent solids (particle size 10-13 microns), while the underflow contained 20-25 percent solids (particle size 70-80 microns). The overflow from hydroclone no. 1 was pumped to a thickener overflow tank which was used as a surge tank to provide $Mg(OH)_2$ slurry to the recycle tank as it was needed to control pH. The underflow from hydroclone no. 1 was diluted with liquor and pumped to hydroclone no. 2. The overflow was pumped to an 8 foot thickener where the $Mg(OH)_2$ and gypsum contamination were allowed to settle. The thickener overflow became the dilution liquor source for hydroclone no. 2. The underflow from hydroclone no. 2 went to a belt filter as gypsum product.

Adequate separation and recycle of magnesium hydroxide is important to overall operation of the sulfur dioxide removal method. Enough magnesium has to be recovered, since if too much magnesium leaves the system with the gypsum solids, there would not be enough left for high SO$_2$ removal efficiencies. Use of the two hydroclones in series, is evidenced in the following:

| TEST | $Mg(OH)_2$ RECOVERY USING ONE HYDROCLONE | MG(OH) RECOVERY TOTAL USING TWO HYDROCLONES |
|---|---|---|
| A | 84.8 | * |
| B | 88.7 | * |
| C | 91.8 | * |
| D | 83.2 | * |
| E | 76.6 | * |
| F | 67.8 | 96.2 |
| G | 83.9 | 92.2 |
| H | 82.5 | 87.0 |
| I | 87.2 | 90.1 |
| J | 80.1 | 96.4 |
| K | 73.4 | 95.9 |
| L | 80.34 | 94.2 |

-continued

| TEST | Mg(OH)₂ RECOVERY USING ONE HYDROCLONE | MG(OH) RECOVERY TOTAL USING TWO HYDROCLONES |
|---|---|---|
| M | 85.9 | 95.9 |
| N | 86.3 | 95.6 |

*SECOND HYDROCLONE NOT IN OPERATION

The second hydroclone separator led to chemical improvements of the gypsum quality also.

The following Table II shows the improved purity of the products and the gypsum content of the number two hydroclone overflow stream and other data from a typical analysis during operation:

TABLE II

CHEMISTRIES OF SOLID SAMPLES OF THE HYDROCLONE STREAMS

| ANALYSIS[1] (%) | REGENERATION TANK (31) TYPICAL ANALYSIS | GENERAL RANGE | HYDROCLONE OVERFLOW #1 TYPICAL ANALYSIS | GENERAL RANGE | HYDROCLONE UNDERFLOW #1 TYPICAL ANALYSIS | GENERAL RANGE |
|---|---|---|---|---|---|---|
| MgO | 11.49 | 11–35.5 | 35.83 | 35–41 | 3.12 | 2.7–5.5 |
| CaO | 22.60 | 21–23.5 | 7.66 | 6–8 | 29.52 | 27–30 |
| S (total) | 13.66 | 11.5–14 | 3.93 | 3–4 | 17.53 | 16–18 |
| $SO_2$ | 0.32 | 0.03–0.6 | 0.48 | 0.03–0.6 | 0.41 | 0–0.6 |
| $SO_3$ | 33.75 | 28.5–34.5 | 9.23 | 7.5–9.5 | 43.31 | 40–44 |
| $SiO_2$ | 3.71 | 3.5–5.5 | 9.13 | 8–10 | 1.11 | 1.0–1.6 |
| Particle Size (Microns) | 31 | 30–35 | 9.8 | 9–12 | 65 | 55–70 |
| % Solids | 4.4 | 4–6 | 1.3 | 1–1.5 | 23.5 | 20–25 |
| Alk. as $CaCO_3$ to pH 6.0 | 11,790 | 10,–17,000 | 10,740 | 10, 17,000 | X | X |
| CALCULATED COMPOSITION | | | | | | |
| $Ma(OH)_2 \cdot \frac{1}{2} H_2O$ | 19.19 | 18.4–22.5 | 59.84 | 58.5–68.5 | 5.21 | 4.5–9.2 |
| $CaSO_3 \cdot \frac{1}{2} H_2O$ | 0.65 | 0.06–1.2 | 0.97 | 0.06–1.2 | 0.83 | 0.0–1.2 |
| $CaSO_4 \cdot 2 H_2O$ | 72.56 | 61–74 | 19.85 | 16–20 | 93.12 | 86–95 |
| $SiO_2$ | 3.71 | 3.5–5.5 | 9.13 | 8–10 | 1.11 | 1–1.6 |
| Total | 96.11 | X | 89–79 | X | 100.27 | X |

| ANALYSIS[1] (%) | HYDROCLONE OVERFLOW #2 TYPICAL ANALYSIS | GENERAL RANGE | HYDROCLONE UNDERFLOW #2 TYPICAL ANALYSIS | GENERAL RANGE |
|---|---|---|---|---|
| MgO | 22.65 | 19–27 | 1.36 | 1.0–2.0 |
| CaO | 15.69 | 13–18 | 30.96 | 29–31 |
| S (total) | 8.51 | 6–10 | 18.40 | 17–19 |
| $SO_2$ | 0.06 | 0.03–0.6 | 0.37 | 0–.7 |
| $SO_3$ | 21.20 | 15–21 | 45.54 | 44–46 |
| $SiO_2$ | 6.76 | 6–9 | 0.49 | .4–.7 |
| Particle Size (Microns) | 11.1 | 10–13 | 79 | 65–80 |
| % Solids | 0.4 | 0.3–1.0 | 22.0 | 20–25 |
| Alk. as $CaCO_3$ to pH 6.0 | 2,390 | 2000–6000 | X | X |
| CALCULATED COMPOSITION | | | | |
| $Ma(OH)_2 \cdot \frac{1}{2} H_2O$ | 37.82 | 32–45 | 2.27 | 1.8–3.6 |
| $CaSO_3 \cdot \frac{1}{2} H_2O$ | 0.12 | 0.06–1.2 | 0.75 | 0.0–1.4 |
| $CaSO_4 \cdot 2 H_2O$ | 45.58 | 32–45 | 97.91 | 95–99 |
| $SiO_2$ | 6.76 | 6–9 | 0.49 | .4–.7 |
| Total | 90.28 | X | 100.42 | X |

[1]Magnesium is reported as MgO: Calcium is reported as CaO: Sulfite is reported as $SO_2$: Sulfate is reported as $SO_3$: Silica is reported as $SiO_2$ In another embodiment of the present method, the oxidized aqueous effluent is divided into a major portion and a minor portion prior to passage to the regeneration tank. The major portion, preferably about 75 percent by weight of the oxidized aqueous effluent discharged from the oxidation unit 19, in line 27 is drawn off through line 57, where the major portion is charged to separator 59, such as a rotary filter. In the separator 59, calcium sulfate solids, as gypsum, present in the major portion of the oxidized aqueous effluent are separated from the aqueous solution and discharged, as indicated through line 61 for disposal or collection, use, or sale. After separation of the calcium sulfate solids in the separator 59, the aqueous media will comprise an aqueous solution of magnesium sulfate which is discharged from the separator 59 through line 63.

The minor portion of the oxidized aqueous effluent, preferably about 25 percent by weight in line 27 is fed by line 27 to the regeneration tank 31 and treated as hereinbefore described.

In a further embodiment of the present method, at least a portion of the dissolved magnesium sulfate solution, after separation of calcium sulfate solids in the separator 59, is diverted from line 63, through line 65 and, by means of a pump 67, is charged through line 69 to the regeneration tank 31.

Figure 2:
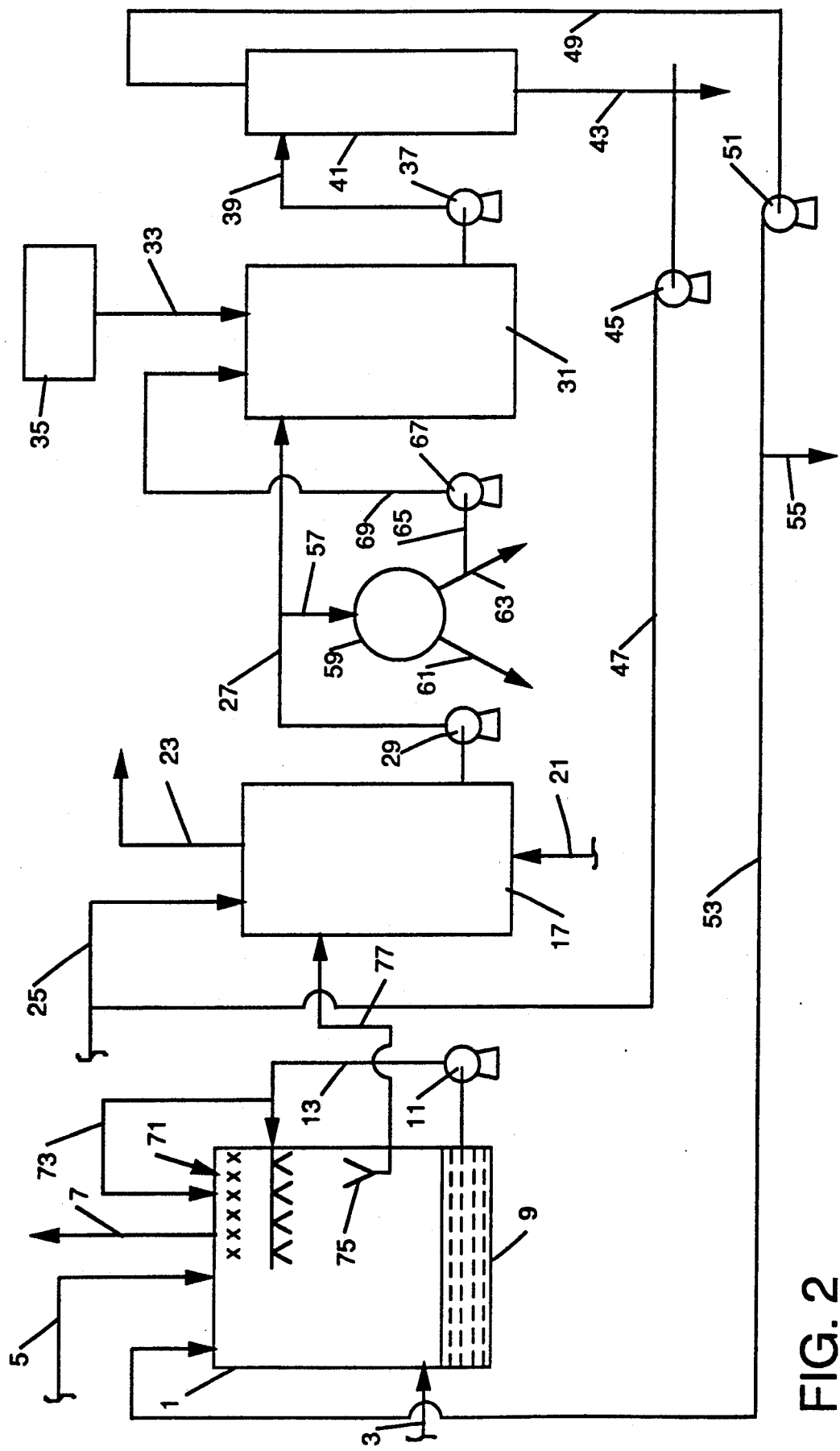
FIG. 2 is a schematic illustration of an alternate embodiment of the method of the present invention.

The embodiment of the present method illustrated in FIG. 2 is similar to that illustrated in FIG. 1, with like reference numerals used for common components, except that the portion of the aqueous discharge from the wet scrubbing unit 1 passed to the oxidation unit 17 is an aqueous solution of magnesium components and magnesium sulfite that is removed from the wet scrubbing unit 1 prior to collection at 9 for recycle. As shown, a portion of the aqueous medium, after contact with the flue gases, which contains magnesium sulfite, is directed at 75, prior to mixing with the collected liquor 9, and is removed from the wet scrubbing unit 1 and passed through line 77 to the oxidation unit 17. As hereinbefore described, the collected aqueous medium 9 which is to be recycled is at a pH of about 6.0 to 6.5. By removing a portion of the aqueous medium at 75, after contact with the flue gases, but prior to mixing with the collected liquor at 9, the aqueous medium removed is at a more acidic pH, i.e., about 5.0 to 6.0, and enables the elimination or reduction in the amount of any acid to maintain the preferred pH in the oxidation unit 17.

What is claimed is:

1. In a method for removing sulfur dioxide from flue gases wherein the flue gases are contacted in a wet scrubbing unit, in the absence of any substantial amount of calcium components, with an aqueous solution of magnesium components and magnesium sulfite produced, with aqueous solution, following said contact, collected and recycled to said wet scrubber for further contact with flue gases, and subjecting a portion of the aqueous discharge from the scrubbing unit, containing magnesium sulfite, to oxidation in an oxidation unit, the improvement comprising:
 adding calcium sulfate to said portion of aqueous discharge containing magnesium sulfite prior to oxidation in said oxidation unit to form an oxidized aqueous effluent containing calcium sulfate solids and dissolved magnesium sulfate;
 passing said oxidized aqueous effluent to a regeneration tank;
 adding lime to said regeneration tank to precipitate gypsum from and form an aqueous magnesium hydroxide suspension in said oxidized aqueous effluent;
 separating said precipitated gypsum from said aqueous magnesium hydroxide suspension; and
 returning at least a portion of said separated precipitated gypsum to said oxidizing unit as said added calcium sulfate.

2. In the method for removing sulfur dioxide from flue gases as defined in claim 1, the improvement wherein said wet scrubbing unit contains demisters for cleaned gases prior to discharge therefrom, and wherein a portion of aqueous solution following said contact is used to wash said demisters.

3. In the method for removing sulfur dioxide from flue gases as defined in claim 1, the improvement wherein said aqueous discharge from the scrubbing unit comprises an aqueous solution of magnesium components and magnesium sulfite removed from said aqueous solution being recycled to said wet scrubbing unit following collection after contact with said flue gases.

4. In the method for removing sulfur dioxide from flue gases as defined in claim 1, the improvement wherein the pH of said oxidized aqueous effluent in said regeneration tank is maintained at a pH between 10.8–11.0.

5. In the method for removing sulfur dioxide from flue gases as defined in claim 1, the improvement wherein, prior to passage to said regeneration tank, a major portion of said oxidized aqueous effluent is passed to a separator, while a minor portion of said oxidized aqueous effluent is passed to said regeneration tank, and separating calcium sulfate solids, as gypsum, from dissolved magnesium sulfate solution in said major portion.

6. In the method for removing sulfur dioxide from flue gases as defined in claim 5, the improvement wherein at least a portion of said dissolved magnesium sulfate solution, after separation of calcium sulfate solids, as gypsum, therefrom, is charged to said regeneration tank.

7. In the method for removing sulfur dioxide from flue gases as defined in claim 5, the improvement wherein said major portion of said oxidized aqueous effluent passed to said separator comprises about 75 percent by weight of the oxidized aqueous effluent.

8. In the method for removing sulfur dioxide from flue gases as defined in claim 7, the improvement wherein said minor portion of said oxidized effluent passed to said regeneration tank comprises about 25 percent by weight of the oxidized aqueous effluent.

9. In the method for removing sulfur dioxide from flue gases as defined in claim 1, the improvement wherein said aqueous discharge from the scrubbing unit comprises an aqueous solution of magnesium components and magnesium sulfite removed from the scrubbing unit prior to said collection for recycle.

10. In a method for removing sulfur dioxide from flue gases wherein the flue gases are contacted in a wet scrubbing unit, in the absence of any substantial amount of calcium components, with an aqueous solution of magnesium components and magnesium sulfite produced with aqueous solution, following contact, collected and recycled to said scrubbing unit for further contact with flue gases, and subjecting a portion of the aqueous discharge from the scrubbing unit, containing magnesium sulfite, to oxidation in an oxidation unit, the improvement comprising;
 adding calcium sulfate to said portion of aqueous discharge containing magnesium sulfate prior to oxidation in said oxidation unit to form an oxidized aqueous effluent containing calcium sulfate solids and dissolved magnesium sulfate;
 passing a major portion of said oxidized aqueous effluent to a separator;
 separating calcium sulfate solids, as gypsum, from dissolved magnesium sulfate solution in said major portion;
 passing a minor portion of said oxidized aqueous effluent to a regeneration tank;
 adding lime to said regeneration tank to precipitate further gypsum from and form an aqueous magnesium hydroxide suspension in said minor portion of said oxidized aqueous effluent, while maintaining the contents of the tank at a pH of between 10.8–11.0.;
 separating said precipitated further gypsum from said aqueous magnesium hydroxide suspension; and
 returning at least a portion of said separated precipitated further gypsum to said oxidizing unit as said added calcium sulfate.

11. In the method for removing sulfur dioxide from flue gases as defined in claim 10, the improvement wherein said aqueous discharge from the scrubbing unit comprises an aqueous solution of magnesium components and magnesium sulfite removed from the scrubbing unit prior to said collection for recycle.

12. In the method for removing sulfur dioxide from flue gases as defined in claim 10, the improvement wherein at least a portion of said dissolved magnesium sulfate, after separation of calcium sulfate solids, as gypsum, therefore, is passed to said regeneration tank.

13. In the method for removing sulfur dioxide from flue gases as defined in claim 10, the improvement wherein said major portion of said oxidized aqueous effluent passed to said separator comprises about 75 percent by weight of the oxidized aqueous effluent, and said minor portion of said oxidized effluent passed to said regeneration tank comprises about 25 percent by weight of said oxidized aqueous effluent.

14. A method of producing a gypsum product and a separated magnesium hydroxide product from the aqueous discharge of a flue gas desulfurizing scrubber containing magnesium sulfite and substantially no calcium components, comprising:

adding calcium sulfate to said aqueous discharge from the flue gas desulfurizing scrubber;

oxidizing said aqueous discharge containing magnesium sulfite and said added calcium sulfate in an oxidizing unit to form an oxidized aqueous effluent containing calcium sulfate solids and dissolved magnesium sulfate;

passing said oxidized aqueous effluent to a regeneration tank;

adding lime to said regeneration tank to precipitate gypsum from and form an aqueous magnesium hydroxide suspension in said oxidized aqueous effluent;

separating said precipitated gypsum from said aqueous magnesium hydroxide suspension; and returning at least a portion of said separated precipitated gypsum to said oxidizing unit as said added calcium sulfate.

15. The method of producing a gypsum product and a separated magnesium hydroxide product as defined in claim 14, wherein prior to passage to said regeneration tank, a major portion of said oxidized effluent is passed to a separator, while a minor portion of said oxidized aqueous effluent is passed to said regeneration tank, and separating calcium sulfate solids, as gypsum, from dissolved magnesium sulfate solution in said major portion.

16. The method of producing a gypsum product and a separated magnesium hydroxide product as defined in claim 15, wherein at least a portion of said dissolved magnesium sulfate solution, after separation of calcium sulfate solids, as gypsum, therefrom, is charged to said regeneration tank.

17. The method of producing a gypsum product and a separated magnesium hydroxide product as defined in claim 14, wherein the pH of said oxidized aqueous effluent in said regeneration tank is maintained at a pH between 10.8–11.0.

18. The method of producing a gypsum product and a separated magnesium hydroxide product as defined in claim 15, wherein said major portion of said oxidized aqueous effluent passed to said separator comprises about 75 percent by weight of the oxidized aqueous effluent.

19. The method of producing a gypsum product and a separated magnesium hydroxide product as defined in claim 18, wherein said minor portion of said oxidized effluent passed to regeneration tank comprises about 25 percent by weight of the oxidized aqueous effluent.

20. In a method for removing sulfur dioxide from flue gases, wherein the flue gases are contacted in a wet scrubbing unit, in the absence of any substantial amount of calcium components, with an aqueous solution of magnesium components and magnesium sulfite produced, with aqueous solution, following contact, collected and recycled to said wet scrubbing unit for further contact with flue gases, and subjecting a portion of the aqueous discharge from the scrubbing unit, containing magnesium sulfite, to oxidation in an oxidation unit, the improvement comprising;

adding calcium sulfate to said portion of aqueous discharge containing magnesium sulfite prior to oxidation in said oxidation unit to form an oxidized aqueous effluent containing calcium sulfate solids and dissolved magnesium sulfate;

passing a major portion of said oxidized aqueous effluent to a separator;

separating calcium sulfate solids, as gypsum, from dissolved magnesium sulfate solution in said major portion;

passing a minor portion of said oxidized aqueous effluent to a regeneration tank;

adding lime to said regeneration tank to precipitate further gypsum from and form an aqueous magnesium hydroxide suspension in said minor portion of said oxidized aqueous effluent, while maintaining the contents of the tank at a pH of between 10.8–11.0;

separating said precipitated further gypsum from said aqueous magnesium hydroxide suspension; and returning at least a portion of said separated precipitated further gypsum to said oxidizing unit as said added calcium sulfate.

21. The method of producing a gypsum product and a separated magnesium hydroxide product as defined in claim 19, wherein said major portion of said oxidized aqueous effluent passed to said separator comprises about 75 percent by weight of the oxidized effluent, and said minor portion of said oxidized effluent passed to the regeneration tank comprises about 25 percent by weight of said oxidized aqueous effluent.

* * * * *

UNITED STATES PATENT OFFICE
CERTIFICATE OF CORRECTION

PATENT NO. : 5,084,255

DATED : Jan. 28, 1992

INVENTOR(S) : John W. College, et al

It is certified that error appears in the above-identified patent and that said Letters Patent is hereby corrected as shown below:

Title page, item

[73]   change "DRAVCO" to read --- DRAVO

Signed and Sealed this

Thirtieth Day of March, 1993

*Attest:*

STEPHEN G. KUNIN

*Attesting Officer*   Acting Commissioner of Patents and Trademarks